United States Patent
Ashida

(10) Patent No.: US 6,327,509 B1
(45) Date of Patent: Dec. 4, 2001

(54) PROGRAMMABLE CONTROLLER DATA COMMUNICATIONS USING VARIABLE NAMES ASSOCIATED WITH DATA ADDRESSES

(75) Inventor: Kazuhide Ashida, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/218,158

(22) Filed: Dec. 22, 1998

(30) Foreign Application Priority Data

Dec. 25, 1997 (JP) ............................. PO9-358016

(51) Int. Cl.[7] ................... G05B 19/18; G06F 15/167
(52) U.S. Cl. .................... 700/5; 700/7; 700/11; 700/20; 700/25; 709/216
(58) Field of Search .................. 700/2, 5, 11, 18, 700/20, 23, 25, 4, 7; 709/216; 711/205

(56) References Cited

U.S. PATENT DOCUMENTS

| | | | |
|---|---|---|---|
| 4,926,375 | * | 5/1990 | Mercer et al. ................ 709/201 |
| 5,406,473 | * | 4/1995 | Yoshikura et al. ............. 700/20 |
| 5,513,095 | * | 4/1996 | Pajonk ......................... 700/20 |
| 5,933,347 | * | 8/1999 | Cook et al. ................... 700/82 |
| 6,088,624 | * | 7/2000 | Khan et al. ................... 700/86 |
| 6,169,928 | * | 1/2001 | Olson et al. .................. 700/7 |

* cited by examiner

*Primary Examiner*—William Grant
*Assistant Examiner*—Paul Rodriguez
(74) *Attorney, Agent, or Firm*—Oblon, Spivak, McClelland, Maier & Neustadt, P.C.

(57) ABSTRACT

An enhanced programmable controller for enabling access to data using internal variable names and public variable names on a communication control interface. The enhanced programmable controller includes a data storage device for storing data required for control. A program memory stores a sequential program. A communication interface communicate with other programmable controllers. A central processing unit executes the sequential program and controls a variable name conversion unit. The variable name conversion unit converts variable names, that are actual functional names, into physical addresses when variable name access is demanded from other programmable controllers.

21 Claims, 6 Drawing Sheets

PROGRAMMABLE CONTROLLER DATA COMMUNICATIONS USING VARIABLE NAMES ASSOCIATED WITH DATA ADDRESSES

BACKGROUND OF THE INVENTION

1. Field of the Invention

This invention relates to a programmable controller that is now widely in use for the control in steel, paper manufacturing plants, such public systems as water supply and drainage, industrial systems such as automobile industry.

2. Description of the Related Art

The conventional data communication for exchanging data among programmable controllers (hereinafter, referred to as PC) is described with reference to FIG. 8. When making the data communication between programmable controllers PC1 and PC2, an address was designated so far corresponding to the construction of equipment such as register numbers (REG. NO.) or device numbers stored in a data storage means of the subject programmable controllers PC1 and PC2. That is, the data exchange using actual functional names (logical names of variables) such as limit switch, emergency shutdown switch, etc. that were used in programs was so far not performed.

A defect of a conventional method described above is that it is not able to access specific data unless being always aware of the internal structure/program structure of an object PC. Even when a PC to be subject to the data communication is a PC that executes a similar program, if a program construction and a memory arrangement differ even slightly, it is necessary to change an access method.

Further, if a communicating PC's program is changed when it is under the execution, there is no means to follow the change.

On the other hand, when data are exchanged in a name of variable, if the arrangement of a subject variable in the other controller is changed, a method to correct it automatically will become necessary. When another program is programmed using a name of variable, it is convenient to gain access to a variable by designating that variable name from the viewpoint of the programming but it is troublesome to obtain an actual address of a variable from a demanded variable name and a time is also needed and furthermore, an address of a variable may possibly be changed constantly with the PC program change in the other controller and it becomes necessary to cope with it and therefore, this method is actually not in practical use.

SUMMARY OF THE INVENTION

The present invention has been made in view of the circumstances described above and it is an object to provide a programmable controller that is able to gain access to data by a variable name and also using official variable names on the communication means.

In order to achieve the object described above, a programmable controller of the present invention is capable of transmitting data between own controller and other controllers, each of which comprises a data storage means to store data required for controlling, a program memory for storing a sequential program, a communication interface for communication with a mating controller and a central processing unit for executing the sequential program and controlling the execution thereof, wherein the program controller is characterized in that it is provided with a variable name conversion means to convert a variable name that is an actual functional name into a physical address when a variable access is demanded to the own controller from the other controller.

According to the above mentioned invention, it becomes possible to access data by a variable name that is actual functional name as the variable name conversion means is provided. Thus, it becomes very convenient from the viewpoint of the programming.

The variable name conversion means comprises an access variable name storage means for storing variable names to execute a variable access in the data of a data storage means in the other controller; an access demanded variable name storage means for storing variable names of the data when the variable access is demanded to the data in a data storage means of the own controller from the other controller; an accessed variable name storage means for storing variable names of the data in the data storage means that are approved by the own controller for the other controller to access the data from the outside; a variable name agreement detecting means to detect the agreement between a variable name stored in the access demanded variable name storage means and a variable name stored in the accessed variable name storage means when the variable access is demanded to the own controller from the other controller, and output an agreement detect signal when the agreement is detected; and a physical address conversion means to convert the agreement detected variable name in the accessed variable name storage means into a physical address in the data storage means when an agreement detecting signal is output from the variable name agreement detecting means.

According to the above mentioned invention, when the own controller is demanded by the other controller to gain access to data by a variable name, that variable name is converted into a physical address stored in the data storage means and it becomes possible to gain access to the data by a variable name between the own controller and the other controller.

Further, a programmable controller according to the invention, wherein it is characterized in that by adding a conversion approving/prohibiting means, and when a physical address corresponding to a variable name of an accessed data in the own controller is changed, the address conversion in the physical address conversion means is suspended temporarily by a command of the central control means and then, the contents of the physical address corresponding to variable name code in the physical address conversion means is rewritten and thereafter, make the physical address conversion from the variable name to the approved state.

According to the above mentioned invention, if a physical address corresponding a variable is changed by any program change, the access of a variable name is enabled by to rewrite the physical address irrespective of the change in the program of the controller in the side to access the variables.

Further, a programmable controller according to the invention, a programmable controller is characterized in that by adding information on data type and number of data to a variable name of the accessed data, after a variable name is converted to a physical address output corresponding to data type and number of data in the physical address conversion means and the access corresponding to various data type and number of data is enabled.

According to the above mentioned invention, it becomes possible to gain access corresponding to data type and number of data as index designation is included in a variable name.

Another variable name conversion means comprises an access variable name storage means for storing variable names to execute a variable access in the data of a data storage means in the other controller; an access demanded variable name storage means for storing the variable names when the variable access is demanded to the data storage means of the own controller from the other controller; an accessed variable name storage means for storing variable names of the data in the data storage means that are approved by the own controller for the other controller to access from the outside; a variable name agreement detecting means for detecting the agreement between a variable name stored in the access demanded variable name storage means and a variable name stored in the accessed variable name storage means when the variable access is demanded to the own controller from the other controller, and output an agreement signal when the agreement is detected; a physical address conversion means for converting the agreement detected variable name in the accessed variable name storage means into a physical address in the data storage means when the agreement detecting signal is output from the variable name agreement means; a variable name storage means for storing a plurality of variable names, data type and number of data; and a data access control means for transferring variable names to the access demanded variable name storage means sequentially according to the contents of the variable name storage means and after the output of the physical address conversion means is decided, executing the access in the number of data which is demanded by using the output address.

According to the above mentioned invention, it becomes possible to gain access to desired data continuously for a plurality of access demanded variable names.

Further, a programmable controller according to the invention, it is characterized in that a command to register variable names in the accessed variable name storage means is provided and the central control means registers variable names in the accessed variable name storage means from an application program.

According to the above invention, it becomes very convenient from the viewpoint of the programming.

Further, a programmable controller according to the invention, it is characterized in that the central control means sends an error response signal to the other controller via the communication control means when an agreement detecting signal is not output from the variable name agreement detecting means.

According to the above invention, the other controller is able to know that the demanded variable does not exists in this controller or the access is not approved.

Further, a programmable controller according to the invention, it is characterized in that an internal variable name conversion means is provided between the accessed variable name storage means and the physical address conversion means to convert an accessed variable name into a variable name in the own controller and by converting a variable name from the other controller into an internal variable name, the data access is executed by using a variable name of a system differing from the communication means.

According to the above invention, the degree of freedom of the programming of application programs is thus expanded.

When an internal variable name conversion means is provided, it may as well that a command is provided to register a variable name in the accessed variable name storage means and further, to register an internal variable name in the internal variable name conversion means and the central control means registers a variable name in the accessed variable name storage means and an internal variable name in the internal variable name conversion means by an application program.

DETAILED DESCRIPTION OF THE PREFERRED EMBODIMENTS

Hereinafter, referring to the attached drawings, embodiments of the present invention are described.

Figure 1:
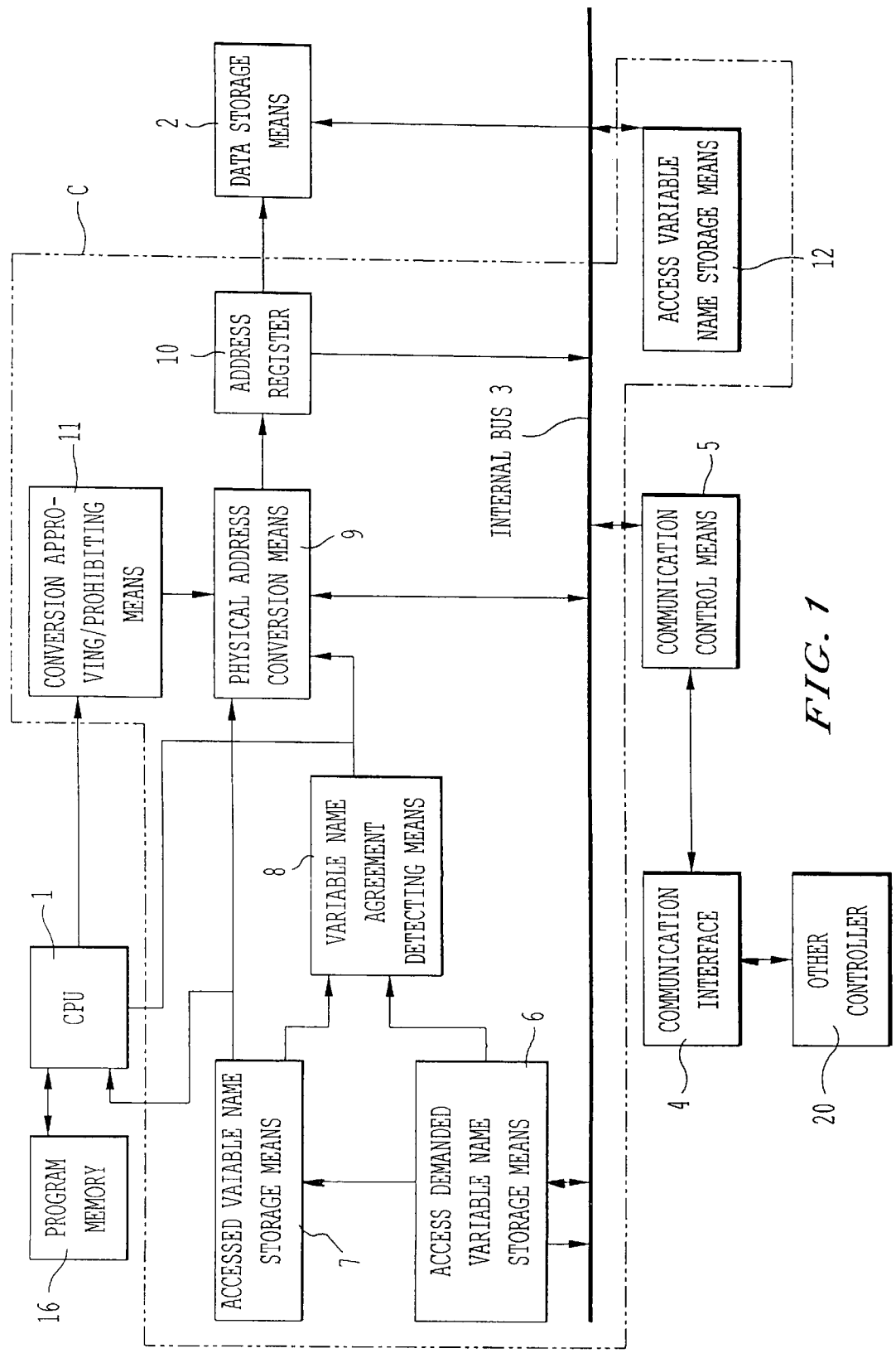
FIG. 1 is a block diagram showing the first embodiment of the programmable controller according to the present invention.

FIG. 1 is a block diagram for explaining a first embodiment which is basic embodiment of the present invention. Shown in FIG. 1, a programmable controller of the present invention is comprised to a conventional PC added with a variable name conversion means C enclosed by a broken line. That is, a conventional PC is capable of transmitting data between the own controller and the other controller, and each controller comprises a data storage means 2 which stores data that are used for a sequential program and variables that are temporarily used, a program memory 16 which stores a sequential program and a user program developed by user, a communication interface 4 which communicates with a mating controller, a communication control means 5, and a CPU (Central Processing Unit) 1 which executes the sequential program and controls the program execution.

In a conventional PC in such a construction, the programmable controller of the present invention is provided with a variable name conversion means C which converts a variable name that is an actual functional name (a logical name of a variable), for instance, a limit switch, an emergency shutdown switch, etc. into a physical address when the variable access is demanded to the own controller by the other controller 20.

As described above, the data access in terms of a variable name that is an actual functional name becomes possible as the variable name conversion means C is provided.

Now, referring to FIG. 1, an embodiment of the variable name conversion means C is definitely described. An internal bus 3 is a microcomputer bus connecting elements in the PC and the CPU 1. A communication interface 4 is an interface circuit for communicating with the other controller 20.

A communication controller 5 performs such controls as provision of data from the CPU 1 to the communication interface 4, data from the other controller to the CPU 1, and has a built in communication buffer memory.

When there is a data access demanded to the programmable controller from the other programmable controller 20, an access demanded variable name storage means 6 is a place to store a variable name of that data. An accessed variable name storage means is a place to register a variable name that is approved by the programmable controller for variable access by the other programmable controller 20.

When another controller demands to gain access to data, a variable name agreement detecting means 8 compares a variable name stored in the access demanded variable name storage means with a variable name stored in the accessed variable name storage means 7, and judges whether the access demanded variable is a variable approved by the programmable controller to gain access to it. After making this comparison for each variable, the variable name agreement detecting means 8 transmits an agreement signal when both variables agreed with each other and an error signal when not agreed to the CPU 1 and a physical address conversion means 9 that will be described later. Further, this variable name agreement detector detecting means 8 can be realized by software using the CPU 1.

Upon receipt of a variable name agreement signal from the variable name agreement detecting means 8, the physical address conversion means 9 converts a variable name from the accessed variable name storage means 7 into a physical address of the data storage means 2. An address register 10 is a place to store the output of the physical address conversion means 9 temporarily for outputting it to the data storage means 2 or the internal bus 3.

A conversion approving/prohibiting means 11 is a circuit to approve/prohibit the operation of the physical address conversion means 9 temporarily according to a command from the CPU 1. An access variable name storage means 12 is a place to store variable names of the other controller 20 to be accessed by the own controller.

First, a case where a data reading in terms of a variable name is demanded from the other controller 20 is described. An access demand from the other controller is stored in a communication buffer in the communication controller 5 and the CPU 1 interprets the demanded contents and stores a variable name in the access demanded variable name storage means 6. Then, when an operating instruction is given to the variable name agreement detecting means 8 by the CPU 1, the variable name agreement detecting means 8 compares variable names in the access demanded variable name storage means 6 with variable names in the accessed variable name storage means 7.

When the demanded variable name exists in the accessed variable name storage means 7, an agreement detecting signal is sent from the variable name agreement detecting means 8 to the CPU 1 and the physical address conversion means 9.

The physical address conversion means 9 converts a variable name into a physical address of the data storage means 2 and outputs it to the address register 10. The CPU 1 is able to read out data from the data storage means 2 using this physical address.

Figure 2:
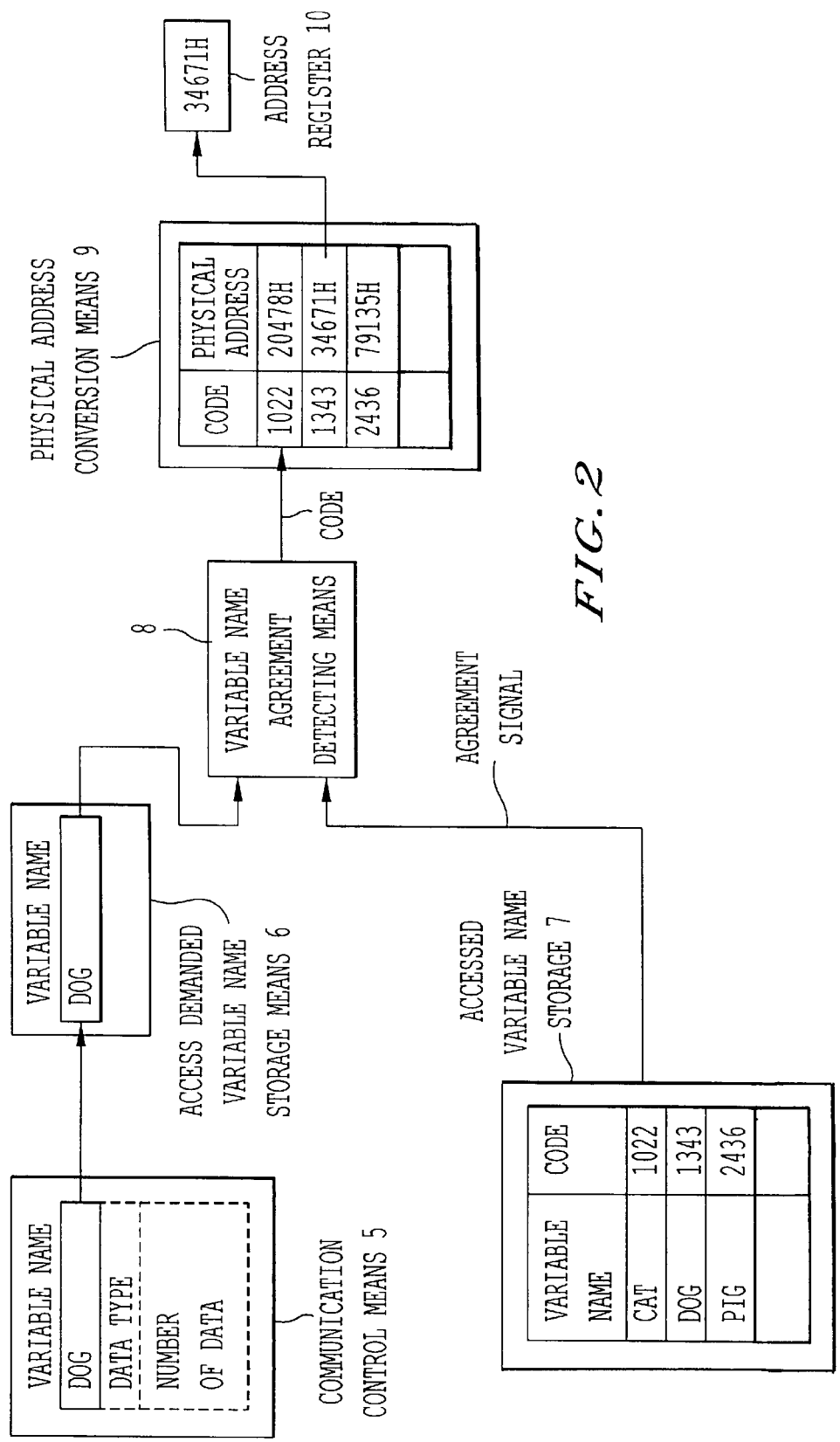
FIG. 2 is a diagram for explaining the conversion of variable name to physical address shown in FIG. 1.

FIG. 2 is a block diagram partially showing FIG. 1 definitely. In FIG. 2, it is assumed that there was a data reading request of a variable name DOG from another controller. This read demanded variable name is transferred to the access demanded variable name storage means 6 from the communication control means 5. This variable name transferred to the access demanded variable name storage means 6 and registered variable names in the accessed variable name storage means 7 are compared in the variable name agreement detecting means 8. In this case, the variable names in the accessed variable name storage means 7 are assigned with corresponding codes, respectively.

When variable names are compared and agreed each other in the variable name agreement detecting means 8, an agreement signal and a variable name code are sent to the physical address conversion means 9. In this case, a code corresponding to a variable name DOG, for instance, 1343 is sent. In the physical address conversion means 9, physical addresses corresponding to code names are stored and in this case, a physical address 34671H corresponding to the code 1343 is stored in the address register 10 as a physical address.

The CPU 1 is able to execute a sequential program or read out data using this physical address.

Figure 3:
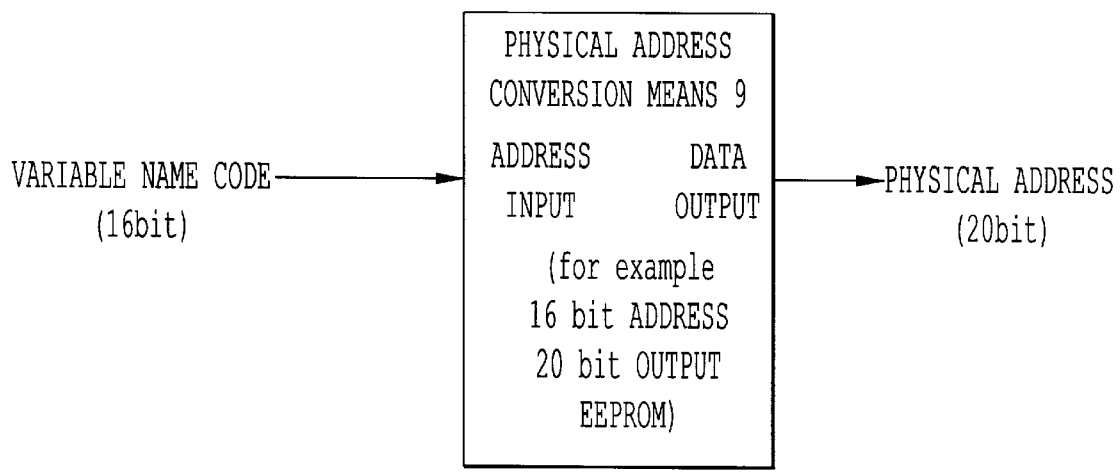
FIG. 3 is a diagram for explaining a means to generate a physical address from a variable name.

The physical address conversion means 9 is constructed, for instance, as shown in FIG. 3. The physical address conversion means 9 can be realized easily using an EEPROM having the number of address bits in the length of a variable name code (16 bits) and a data output width in physical address length (20 bits).

Next, a case where physical address of a variable is changed for the reason that the program change is generated in the own PC is described. On a conventional PC, in this case the program change of a PC at the variable access side was required but it is not required for the PC of the present invention. When physical addresses of variables registered in the accessed variable name storage means 7 within variables in the own PC is changed, the address conversion in the physical address conversion means 9 is suspended temporarily as the CPU 1 so instructs the conversion approving/prohibiting means 11.

Then, the contents of a physical address corresponding to a variable name code is rewritten. Thereafter, by approving the conversion again, the address conversion can be continuously performed.

This is equivalent to the rewriting of data contents of an address equivalent to a variable name code in EEPROM in FIG. 3.

Further, as shown in FIG. 2, a top address of a variable is obtained according to the means previously explained by making the access with data type such as real numbers and integers and number of data added to an access variable name and thereafter, it is possible to make the data access according to the added data type and number of data. This is useful when the index designation is included in a variable name.

This can be achieved by multiplying a data length that is decided by data type according to an index designation and an index in the physical address conversion means 9 and then, adding the result to the output of the circuit shown in FIG. 3.

Figure 4:
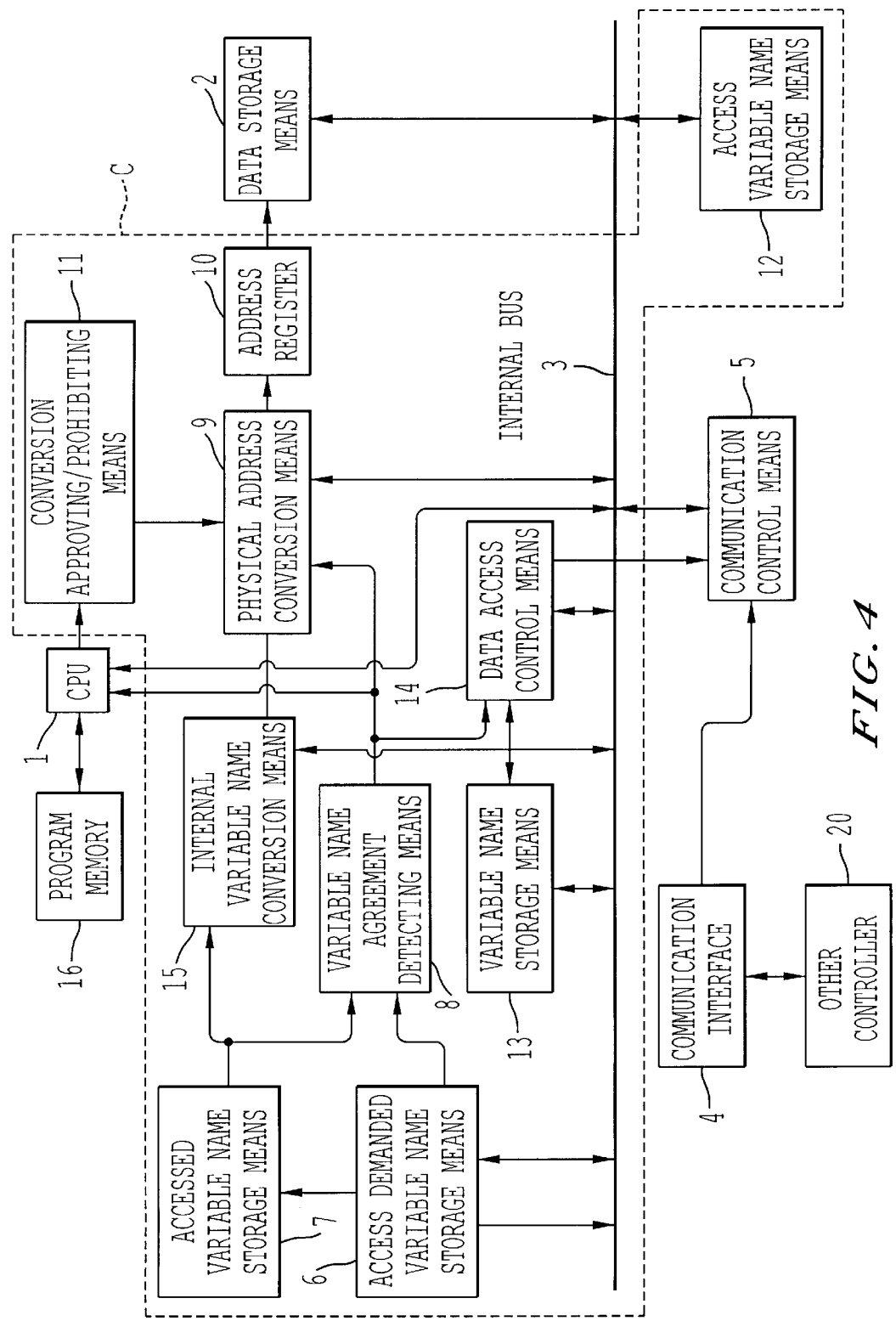
FIG. 4 is a block diagram showing the second embodiment of the programmable controller according to the present invention.

FIG. 4 is a block diagram for explaining a second embodiment of the present invention. This diagram differs from FIG. 1 in that a variable name storage means 13, a data access control means 14 and an internal variable name conversion means 15 are newly added.

The variable name storage means 13 stores variable name, data type and number of data of a plurality of variables. The data access control means 14 transfers variable names in the variable name storage means 13 successively according to the contents of the variable name storage means 13 to the access demanded variable name storage means 6 and after the output of the physical address conversion means 9 is decided, using its output address, accesses the demanded number of data and writes the access results into the data storage means 2 and the communication buffer in the communication control means 5.

When a programmable controller is constructed as described above, it becomes possible to process access demands for a plurality of variables. The data access control means 14 can be constructed using a DMA (Direct Memory Access) controller, a dedicated microprocessor, etc.

Next, a method to register variable names which the access thereto by the other controller is approved by PC in the accessed variable name storage means 7 is described. When a user of PC executes the data exchange with other controller, it is possible to register variable names using a programming tool; however, it becomes necessary in this case to set a variable name whenever a program is loaded in the PC and it is inconvenient.

Figure 5:
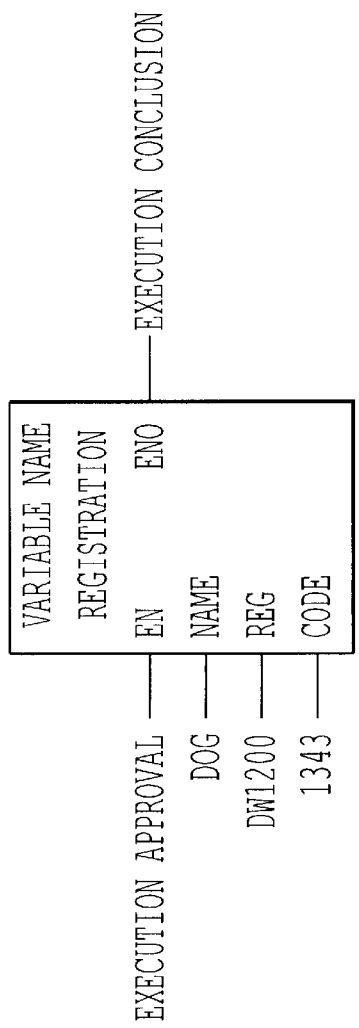
FIG. 5 is a diagram for explaining a command to set variable names and physical addresses.

So, it is convenient to register a variable name from an application program by providing a sequential command to register variable names to the accessed variable name storage means 7. For instance, in a rudder diagram and a function block diagram, such a command as shown in FIG. 5 is usable. The command shown in FIG. 5 is to designate "DOG" to a variable name shown by a parameter "NAME" in the command when an execution approval signal is ON, store a physical address of a register DW1200 at a physical address shown by a parameter "REG" and store Code 1343 for the variable name code shown by a parameter "CODE".

Using the above-mentioned command, the CPU 1 is able to set variable names and codes in the accessed variable name storage means 7 and physical addresses of registers in the physical address conversion means 9 shown in FIG. 2. As a code is merely to connect entries of the accessed variable name storage means 7 and the physical address conversion means 9, it can be omitted in the command shown in FIG. 5.

When a variable name demanded by the other controller to access thereto was not registered in the accessed variable name storage means 7, an error signal is output from the variable name agreement detecting means 8.

Upon receipt of an error signal, the CPU 1 sends an error response through the communication control means 5 to the other controller that demanded the variable access. Thus, the other controller is able to know that the demanded variable does not exists in this PC or the access is not approved.

Figure 6:
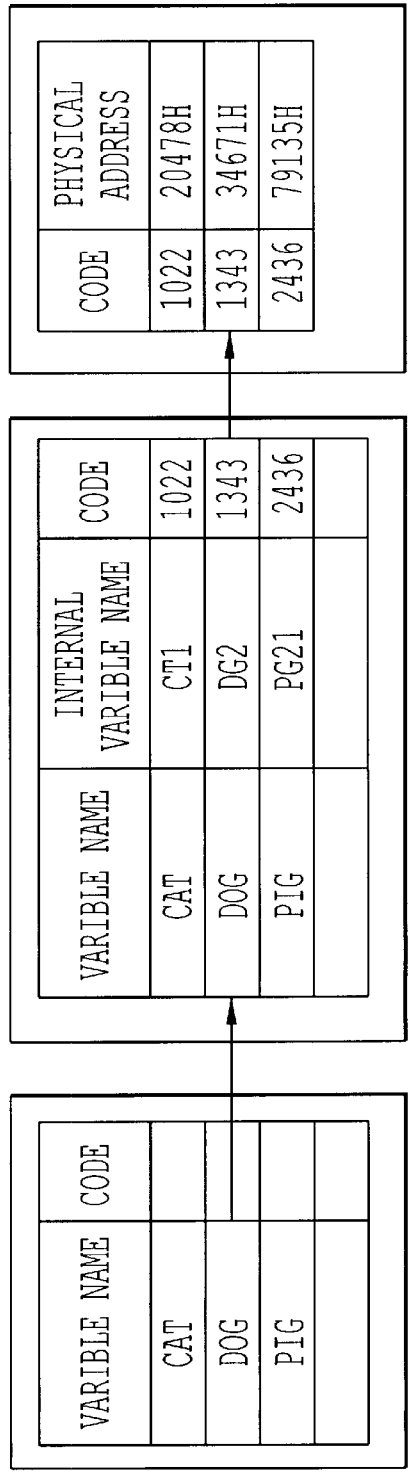
FIG. 6 is a diagram for explaining the conversion among external variable names, internal variable names and physical addresses in FIG. 4.

Next, the embodiment shown in FIG. 4 is described in detail. In FIG. 4, the internal variable name conversion means 15 is provided between the accessed variable name storage means 7 and the physical address conversion means 9. The contents of the internal variable name conversion means 15 are as shown in FIG. 6. In FIG. 6, variable names registered in the accessed variable name storage means 7 are so-called external variable names (public external logical names) that are used on the communication control means 5 between programmable controllers. On the contrary, internal variable names (internal logical names) registered in the internal variable name conversion means 15 are so-called local variable names that are used only in the own PC. By adding a code to this internal variable name, it is able to correspond to the physical address conversion means 9.

In the above-mentioned construction, other controller is enabled to access a variable using a variable name that is publicly announced to the outside by the own PC and the own PC is able to change variable names in the own PC, and the degree of freedom of the programming of application programs is thus expanded. Further, even when physical addresses of variables are changed, the access to those variables is guaranteed by the mechanism explained so far. A command to set variable names in the internal variable name conversion means 15 is also considered necessary for the reason explained previously.

Figure 7:
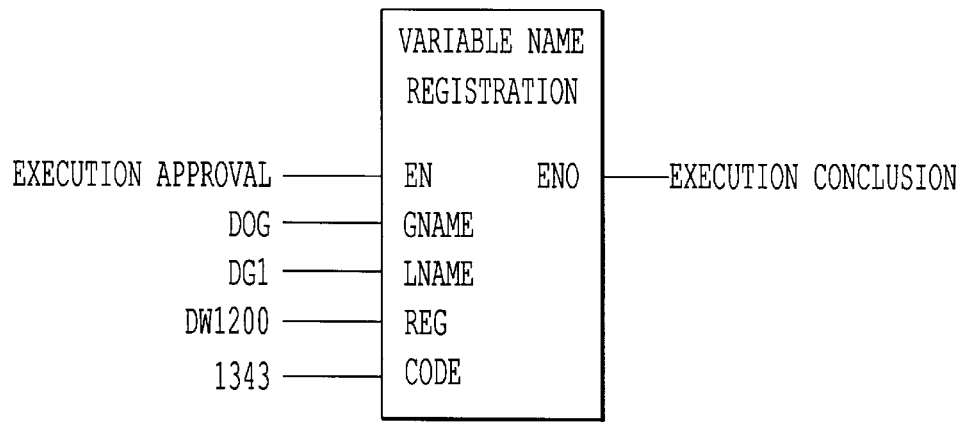
FIG. 7 is a diagram for explaining a command to set external variable names, internal variable names and physical addresses.
Figure 8:
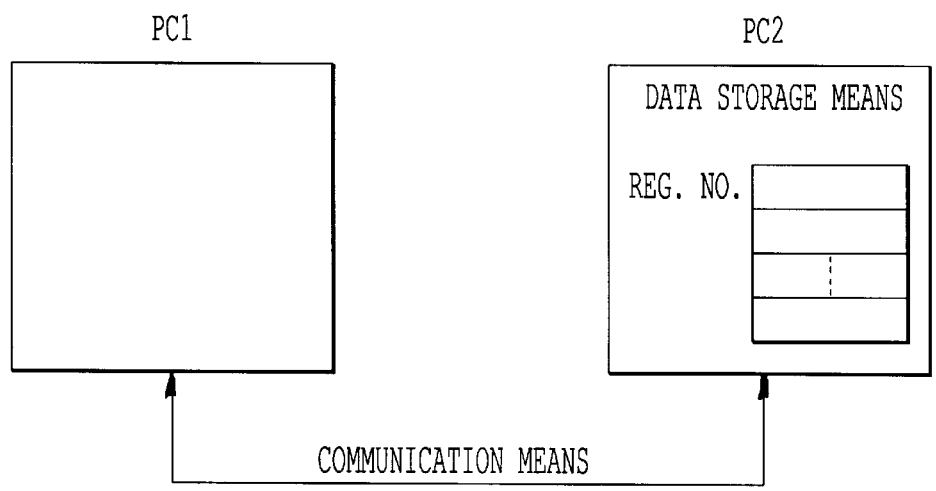
FIG. 8 is a diagram for explaining data access between conventional PCs.

A command shown in FIG. 7 fulfills its function. The command shown in FIG. 7 is a command to designate a variable name "DOG" to an external variable name shown by a parameter GNAME in the command, designate an internal variable name "DG1" to an internal variable name shown by a parameter LNAME, store a physical address of a register DW1200 at a physical address of a register shown by a parameter REG and store a code 1343 for a variable name code shown by a parameter CODE. Using the above-mentioned command, the CPU 1 is able to set an external variable name in the accessed variable name storage means 7, an external variable name, internal variable name and codes in the internal variable name conversion means 15 and physical addresses of registers in the physical address conversion mean 9 shown in FIG. 4. Codes are merely to connect entries of the internal variable name conversion means 15 and the physical address conversion means 9 and can be omitted in the command show in FIG. 7.

According to the present invention described above, it is possible to provide a programmable controller that is capable of enabling it to access data in variable names and to access data using public variable names on the communication means.

What is claimed is:

1. A programmable controller capable of performing data communication between the programmable controller and other programmable controllers comprising:

a data storage means for storing data required for control;

a program memory to store a sequential program;

a communication interface for communicating with other programmable controllers;

a variable name conversion means for converting a variable name that is an actual functional name into a physical address when variable access is demanded to the programmable controller from the other programmable controllers;

a central control means for executing the sequential program and controlling the variable name conversion means; and a communication control means for controlling data communication between the central means and the communication interface, wherein the communication control means includes a communication buffer.

2. The programmable controller according to claim 1, wherein the variable name conversion means further comprises:

an access variable name storage means for storing variable names to execute variable access in the data of a data storage means in the other programmable controllers;

an access demanded variable name storage means for storing access demanded variable names when variable access is demanded to the data storage means of the programmable controller from the other programmable controllers;

an accessed variable name storage means for storing accessed variable names of the data in the data storage means in the programmable controller that are approved by the programmable controller for variable access by the other programmable controllers;

a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected; and a physical address conversion means for converting the accessed variable names in the accessed variable name storage means into a physical address in the data storage means in the programmable controller when the agreement detecting signal is output from the variable name agreement detecting means; and an address register for storing an output of the physical address conversion means.

3. The programmable controller according to claim 1, wherein the variable name conversion means further comprises:

an access variable name storage means for storing variable names to execute variable access in the data of a data storage means in the other programmable controllers;

an access demanded variable name storage means for storing access demanded variable names when variable access is demanded to the data storage means of the programmable controller from the other programmable controllers;

an accessed variable name storage means for storing a accessed variable names of the data in the data storage means in the programmable controller that are approved by the programmable controller for variable access by the other programmable controllers, a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected;

a physical address conversion means for converting the accessed variable names in the accessed variable name storage means into a physical address in the data storage means in the programmable controller when the agreement detecting signal is output from the variable name agreement detecting means;

an address register for storing an output of the physical address conversion means;

a variable name storage means for storing a plurality of variable names, data type and number of data; and a data access control means for transferring variable names to the access demanded variable name storage means sequentially according to contents of the variable name storage means and, after the output of the physical address conversion means is decided, executing the access in the number of data which is demanded by using the physical address.

4. A programmable controller capable of performing data communication between the programmable controller and other programmable controllers comprising:

a data storage means for storing data required for control;

a program memory to store a sequential program;

a communication interface for communicating with other programmable controllers;

a central control means for executing the sequential program and controlling the program execution;

a variable name conversion means for converting a variable name that is an actual functional name into a physical address when variable access is demanded to the programmable controller from the other programmable controllers, wherein the variable name conversion means further comprises an access variable name storage means for storing variable names to execute variable access in the data of a data storage means in the other programmable controllers, an access demanded variable name storage means for storing access demanded variable names when variable access is demanded to the data storage means of the programmable controller from the other programmable controllers, an accessed variable name storage means for storing accessed variable names of the data in the data storage means in the programmable controller that are approved by the programmable controller for variable access by the other programmable controllers, a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected, and a physical address conversion means for converting the accessed variable names in the accessed variable name storage means into a physical address in the data storage means in the programmable controller when the agreement detecting signal is output from the variable name agreement detecting means; and a conversion approving/prohibiting means, wherein when a physical address corresponding to a variable name of an accessed data in the programmable controller is changed, an address conversion in the physical address conversion means is suspended temporarily by a command of the central control means and then, contents of the physical address corresponding to a variable name code in the physical address conversion means is rewritten, and the physical address conversion from the accessed variable name to an approved state is made.

5. The programmable controller according to claim 4, wherein by adding information on data type and number of data to the accessed variable name, after the accessed variable name is converted to a physical address output corresponding to data type and number of data in the physical address conversion means and data access corresponding to the data type and the number of data is enabled.

6. A programmable controller capable of performing data communication between the programmable controller and other programmable controllers comprising:

a data storage means for storing data required for control;

a program memory to store a sequential program;

a communication interface for communicating with other programmable controllers;

a central control means for executing the sequential program and controlling the program execution;

a variable name conversion means for converting a variable name that is an actual functional name into a physical address when variable access is demanded to the programmable controller from the other programmable controllers, wherein the variable name conversion means further comprises an access variable name storage means for storing variable names to execute variable access in the data of a data storage means in the other programmable controllers, an access demanded variable name storage means for storing access demanded variable names when variable access is demanded to the data storage means of the programmable controller from the other programmable controllers, an accessed variable name storage means for storing accessed variable names of the data in the data storage means in the programmable controller that are approved by the programmable controller for variable access by the other programmable controllers, a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected, and a physical address conversion means for converting the accessed variable names in the accessed variable name storage means into a physical address in the data storage means in the programmable controller when the agreement detecting signal is output from the variable name agreement detecting means; and the programmable controller, wherein by adding information on data type and number of data to the accessed variable name, after the accessed variable name is converted to a physical address output corresponding to data type and number of data in the physical address; conversion means and data access corresponding to the data type and the number of data is enabled.

7. A programmable controller capable of performing data communication between the programmable controller and other programmable controllers comprising:

a data storage means for storing data required for control;

a program memory to store a sequential program;

a communication interface for communicating with other programmable controllers;

a central control means for executing the sequential program and controlling the program execution;

a variable name conversion means for converting a variable name that is an actual functional name into a physical address when variable access is demanded to the programmable controller from the other programmable controllers, wherein the variable name conversion means further comprises an access variable name storage means for storing variable names to execute variable access in the data of a data storage means in the other programmable controllers, an access demanded variable name storage means for storing access demanded variable names when variable access is demanded to the data storage means of the programmable controller from the other programmable controllers, an accessed variable name storage means for storing accessed variable names of the data in the data storage means in the programmable controller that are approved by the programmable controller for variable access by the other programmable controllers, a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected, and a physical address conversion means for converting the accessed variable names in the accessed variable name storage means into a physical address in the data storage means in the programmable controller when the agreement detecting signal is output from the variable name agreement detecting means; and the central control means provides a command to register accessed variable names in the accessed variable name storage means and the central control means registers accessed variable names in the accessed variable name storage means from an application program.

8. A programmable controller capable of performing data communication between the programmable controller and other programmable controllers comprising:

a data storage means for storing data required for control;

a program memory to store a sequential program;

a communication interface for communicating with other programmable controllers;

a central control means for executing the sequential program and controlling the program execution;

a variable name conversion means for converting a variable name that is an actual functional name into a physical address when variable access is demanded to the programmable controller from the other programmable controllers, wherein the variable name conversion means further comprises an access variable name storage means for storing variable names to execute variable access in the data of a data storage means in the other programmable controllers, an access demanded variable name storage means for storing access demanded variable names when variable access is demanded to the data storage means of the programmable controller from the other programmable controllers, an accessed variable name storage means for storing accessed variable names of the data in the data storage means in the programmable controller that are approved by the programmable controller for variable access by the other programmable controllers, a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected, and a physical address conversion means for converting the accessed variable names in the accessed variable name storage means into a physical address in the data storage means in the programmable controller when the agreement detecting signal is output from the variable name agreement detecting means; and the programmable controller, wherein the central control means sends an error response signal to the other programmable controllers via the communication control means when the agreement detecting signal is not output from the variable name agreement detecting means.

9. A programmable controller capable of performing data communication between the programmable controller and other programmable controllers comprising:

a data storage means for storing data required for control;

a program memory to store a sequential program;

a communication interface for communicating with other programmable controllers;

a central control means for executing the sequential program and controlling the program execution;

a variable name conversion means for converting a variable name that is an actual functional name into a physical address when variable access is demanded to the programmable controller from the other programmable controllers, wherein the variable name conversion means further comprises an access variable name storage means for storing variable names to execute variable access in the data of a data storage means in the other programmable controllers, an access demanded variable name storage means for storing access demanded variable names when variable access is demanded to the data storage means of the programmable controller from the other programmable controllers, an accessed variable name storage means for storing accessed variable names of the data in the data storage means in the programmable controller that are approved by the programmable controller for variable access by the other programmable controllers, a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected, and a physical address conversion means for converting the accessed variable names in the accessed variable name storage means into a physical address in the data storage means in the programmable controller when the agreement detecting signal is output from the variable name agreement detecting means;

a variable name storage means for storing a plurality of variable names, data type and number of data;

a data access control means for transferring variable names to the access demanded variable name storage means sequentially according to contents of the variable name storage means and, after the output of the physical address conversion means is decided, for executing variable access in the number of data which is demanded by using the physical address;

an internal variable name conversion means is provided connected between the accessed variable name storage means and the physical address conversion means to convert the accessed variable name into an internal variable name in the programmable controller and data access is executed by using a variable name code to connect the internal variable name and the physical address in the physical address conversion means.

10. The programmable controller according to claim 9, wherein the central control means provides a command to register the accessed variable name in the accessed variable name storage means and the internal variable name in the internal variable name conversion means; and the central control means registers the accessed variable name in the accessed variables name storage means and the internal variable name in the internal variable name conversion means by an application program.

11. A programmable controller capable of performing data communication between the programmable controller and other programmable controllers comprising:

a data storage means for storing data required for control;

a program memory to store a sequential program;

a communication interface for communication with other programmable controllers;

a central control means for executing the sequential program and controlling the program execution;

a variable name conversion means for converting a variable name that is an actual functional name into a physical address when variable access is demanded to the programmable controller from the other programmable controllers, wherein the variable name conversion means further comprises an access variable name storage means for storing variable names to execute variable access in the data of a data storage means in the other programmable controllers, an access demanded variable name storage means for storing access demanded variable names when variable access is demanded to the data storage means of the programmable controller from the other programmable controllers, an accessed variable name storage means for storing accessed variable names of the data in the data storage means in the programmable controller that are approved by the programmable controller for variable access by the other programmable controllers, a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected, and a physical address conversion means for converting the accessed variable names in the accessed variable name storage means into a physical address in the data storage means in the programmable controller when the agreement detecting signal is output from the variable name agreement detecting means;

a variable name storage means for storing configured to store a plurality of variable names, data type and number of data;

a data access control means for transferring variable names to the access demanded variable name storage means sequentially according to contents of the variable name storage means and, after the output of the physical address conversion means is decided, for executing variable access in the number of data which is demanded by using the physical address; and the central control means provides a command to register accessed variable names in the accessed variable name storage means and the central control means registers accessed variable names in the accessed variable name storage means from an application program.

12. A programmable controller capable of performing data communication between the programmable controller and other programmable controllers comprising:

a data storage means for storing data required for control;

a program memory to store a sequential program;

a communication interface for communicating with other programmable controllers;

a central control means for executing the sequential program and controlling the program execution;

a variable name conversion means for converting a variable name that is an actual fictional name into a physical address when variable access is demanded to the programmable controller from the other programmable controllers, wherein the variable name conversion means further comprises an access variable name storage means for storing variable names to execute variable access in the data of a data storage means in the other programmable controllers, an access demanded variable name storage means for storing access demanded variable names when variable access is demanded to the data storage means of the programmable controller from the other programmable controllers, an accessed variable name storage means for storing accessed variable names of the data in the data storage means in the programmable controller that are approved by the programmable controller for variable access by the other programmable controllers, a variable name agreement detecting means for detecting agreement between the access demanded variable names stored in the access demanded variable name storage means and the accessed variable names stored in the accessed variable name storage means when variable access is demanded to the programmable controller from the other programmable controllers, and for outputting an agreement detecting signal when agreement is detected, and a physical address conversion means for converting the accessed variable names in the accessed variable name storage means into a physical address in the data storage means in the programmable controller when the agreement detecting signal is output from the variable name agreement detecting means;

a variable name storage means for storing configured to store a plurality of variable names, data type and number of data;

a data access control means for transferring variable names to the access demanded variable name storage means sequentially according to contents of the variable name storage means and, after the output of the physical address conversion means is decided, for executing variable access in the number of data which is demanded by using the physical address; and the programmable controller, wherein the central control means sends an error response signal to the other programmable controllers via the communication control means when the agreement detecting signal is not output from the variable name agreement detecting means.

13. A programmable controller configured to perform data communication between the programmable controller and other programmable controllers comprising:

a data storage configured to store data required for control;

a program memory configured to store a sequential program;

a communication interface configured to communicate with other programmable controllers;

a variable name converter configured to convert a variable name that is an actual functional name into a physical address when variable access is demanded to the programmable controller from the other programmable controllers;

a central controller configured to execute the sequential program and to control the variable name converter; and a communication controller configured to control data communication between the central controller and the communication interface, wherein the communication controller includes a communication buffer.

14. The programmable controller according to claim 13, wherein the variable name converter further comprises:

an access variable name storage configured to store variable names and to execute variable access in the data of a data storage in the other programmable controllers;

an access demanded variable name storage configured to store access demanded variable names when variable access is demanded to the data storage of the programmable controller from the other programmable controllers;

an accessed variable name storage configured to store accessed variable names of the data in the data storage in the programmable controller that are approved by the programmable controller for variable access by the other programmable controllers;

a variable name agreement detector configured to detect agreement between the access demanded variable names stored in the access demanded variable name storage and the accessed variable names stored in the accessed variable name storage when variable access is demanded to the programmable controller from the other programmable controllers, and to output an agreement detecting signal when agreement is detected; and a physical address converter configured to convert the accessed variable names in the accessed variable name storage into a physical address in the data storage in the programmable controller when the agreement detecting signal is output from the variable name agreement detector; and an address register configured to store an output of the physical address converter.

15. The programmable controller according to claim 13, wherein the variable name converter further comprises:
- an access variable name storage configured to store variable names and to execute variable access in the data of a data storage in the other programmable controllers;
- an access demanded variable name storage configured to store access demanded variable names when variable access is demanded to the data storage of the programmable controller from the other programmable controllers;
- an accessed variable name storage configured to store accessed variable names of the data in the data storage in the programmable controller that are approved by the programmable controller for variable access by the other programmable controllers;
- a variable name agreement detector configured to detect agreement between the access demanded variable names stored in the access demanded variable name storage and the accessed variable names stored in the accessed variable name storage when variable access is demanded to the programmable controller from the other programmable controllers, and to output an agreement detecting signal when agreement is detected;
- a physical address converter configured to convert the accessed variable names in the accessed variable name storage into a physical address in the data storage in the programmable controller when the agreement detecting signal is output from the variable name agreement detector;
- an address register configured to store an output of the physical address converter;
- a variable name storage configure to store a plurality of variable names, data type and number of data; and
- a data access controller configured to transfer variable names to the access demanded variable name storage sequentially according to contents of the variable name storage and, after the output of the physical address converter is decided, to execute the access in the number of data which is demanded by the physical address.

16. A programmable controller configured to perform data communication between the programmable controller and other programmable controllers comprising:
- a data storage configured to store data required for control;
- a program memory configured to store a sequential program;
- a communication interface configured to communicate with other programmable controllers;
- a central controller configured to execute the sequential program and control the program execution;
- a variable name converter configured to convert a variable name that is an actual functional name into a physical address when variable access is demanded to the programmable controller from the other programmable controllers,
- wherein the variable name converter further comprises
- an access variable name storage configured to store variable names and to execute variable access in the data of a data storage in the other programmable controllers,
- an access demanded variable name storage configured to store access demanded variable names when variable access is demanded to the data storage of the programmable controller from the other programmable controllers,
- an accessed variable name storage configured to store accessed variable names of the data in the data storage in the programmable controller that are approved by the programmable controller for variable access by the other programmable controllers,
- a variable name agreement detector configured to detect agreement between the access demanded variable names stored in the access demanded variable name storage and the accessed variable names stored in the accessed variable name storage when variable access is demanded to the programmable controller from the other programmable controllers, and to output an agreement detecting signal when agreement is detected, and
- a physical address converter configured to convert the accessed variable names in the accessed variable name storage into a physical address in the data storage in the programmable controller when the agreement detecting signal is output from the variable name agreement detector; and
- a conversion approver/prohibiter configured to approve/prohibit, wherein when a physical address corresponding to a variable name of an accessed data in the programmable controller is changed, an address conversion in the physical address converter is suspended temporarily by a command of the central controller and then, contents of the physical address corresponding to a variable name code in the physical address converter is rewritten, and the physical address converter from the accessed variable name to an approved state is made.

17. A programmable controller configured to perform data communication between the programmable controller and other programmable controllers comprising:
- a data storage configured to store data required for control;
- a program memory configured to store a sequential program;
- a communication interface configured to communicate with other programmable controllers;
- a central controller configured to execute the sequential program and control the program execution;
- a variable name converter configured to convert a variable name that is an actual functional name into a physical address when variable access is demanded to the programmable controller from the other programmable controllers,
- wherein the variable name converter further comprises
- an access variable name storage configured to store variable names and to execute variable access in the data of a data storage in the other programmable controllers,
- an access demanded variable name storage configured to store access demanded variable names when variable access is demanded to the data storage of the programmable controller from the other programmable controllers,
- an accessed variable name storage configured to store accessed variable names of the data in the data storage in the programmable controller that are approved by the programmable controller for variable access by the other programmable controllers,
- a variable name agreement detector configured to detect agreement between the access demanded variable names stored in the access demanded variable name storage and the accessed variable names stored in the accessed variable name storage when variable access is demanded to the programmable controller from the other programmable controllers, and to output an agreement detecting signal when agreement is detected, and a physical address converter configured to convert the accessed variable names in the accessed variable name storage into a physical address in the data storage in the programmable controller when the agreement detecting signal is output from the variable name agreement detector; and the programmable controller, wherein by adding information on data type and number of data to the accessed variable name, after the accessed variable name is converted to a physical address output corresponding to data type and number of data in the physical address converter and data access corresponding to the data type and the number of data is enabled.

18. A programmable controller configured to perform data communication between the programmable controller and other programmable controllers comprising:

a data storage configured to store data required for control;

a program memory configure to store a sequential program;

a communication interface configured to communicate with other programmable controllers;

a central controller configured to execute the sequential program and to control the program execution;

a variable name converter configured to convert a variable name that is an actual functional name into a physical address when variable access is demanded to the programmable controller from the other programmable controllers, wherein the variable name converter further comprises an access variable name storage configure to store variable names and to execute variable access in the data of a data storage in the other programmable controllers, an access demanded variable name storage configured to store access demanded variable names when variable access is demanded to the data storage of the programmable controller from the other programmable controllers, an accessed variable name storage configured to store accessed variable names of the data in the data storage in the programmable controller that are approved by the programmable controller for variable access by the other programmable controllers, a variable name agreement detector configured to detect agreement between the access demanded variable names stored in the access demanded variable name storage and the accessed variable names stored in the accessed variable name storage when variable access is demanded to the programmable controller from the other programmable controllers, and to output an agreement detecting signal when agreement is detected, and a physical address converter configured to convert the accessed variable names in the accessed variable name storage into a physical address in the data storage in the programmable controller when the agreement detecting signal is output from the variable name agreement detector; and the central controller configured to provide a command to register accessed variable names in the accessed variable name storage and the central controller registers accessed variable names in the accessed variable name storage from an application program.

19. A programmable controller configured to perform data communication between the programmable controller and other programmable controllers comprising:

a data storage configured to store data required for control;

a program memory configured to store a sequential program;

a communication interface configured to communicate with other programmable controllers;

a central controller configured to execute the sequential program and to control the program execution;

a variable name converter configured to convert a variable name that is an actual functional name into a physical address when variable access is demanded to the programmable controller from the other programmable controllers, wherein the variable name converter further comprises an access variable name storage configured to store variable names and to execute variable access in the data of a data storage in the other programmable controllers, an access demanded variable name storage configured to store access demanded variable names when variable access is demanded to the data storage of the programmable controller from the other programmable controllers, an accessed variable name storage configured to store accessed variable names of the data in the data storage in the programmable controller that are approved by the programmable controller for variable access by the other programmable controllers, a variable name agreement detector configured to detect agreement between the access demanded variable names stored in the access demanded variable name storage and the accessed variable names stored in the accessed variable name storage when variable access is demanded to the programmable controller from the other programmable controllers, and for to output an agreement detecting signal when agreement is detected, and a physical address configured to convert the accessed variable names in the accessed variable name storage into a physical address in the data storage in the programmable controller when the agreement detecting signal is output from the variable name agreement detector, and the programmable controller, wherein the central controller is configured to send an error response signal to the other programmable controllers via the communication controller when the agreement detecting signal is not output from the variable name agreement detector.

20. A programmable controller configured to perform data communication between the programmable controller and other programmable controllers comprising:

a data storage configured to store data required for control;

a program memory configured to store a sequential program;

a communication interface configured to communicate with other programmable controllers;

a central controller configured to execute the sequential program and to control the program execution;

a variable name converter configured to convert a variable name that is an actual functional name into a physical address when variable access is demanded to the programmable controller from the other programmable controllers, wherein the variable name converter further comprises an access variable name storage configured to store variable names and to execute variable access in the data of a data storage in the other programmable controllers, an access demanded variable name storage configured to store access demanded variable names when variable access is demanded to the data storage of the programmable controller from the other programmable controllers, an accessed variable name storage configured to store accessed variable names of the data in the data storage in the programmable controller that are approved by the programmable controller for variable access by the other programmable controllers, a variable name agreement detector configured to detect agreement between the access demanded variable names stored in the access demanded variable name storage and the accessed variable names stored in the accessed variable name storage when variable access is demanded to the programmable controller from the other programmable controllers, and for to output an agreement detecting signal when agreement is detected, and a physical address converter configured for converting the accessed variable names in the accessed variable name storage into a physical address in the data storage in the programmable controller when the agreement detecting signal is output from the variable name agreement detector;

a variable name storage configured to store a plurality of variable names, data type and number of data;

a data access controller configure to transfer variable names to the access demanded variable name storage sequentially according to contents of the variable name storage and, after the output of the physical address converter is decided, to execute variable access in the number of data which is demanded by using the physical address;

an internal variable name converter configured to convert the accessed variable name into an internal variable name in the programmable controller and to execute data access by using a variable name code to connect the internal variable name and the physical address in the physical address converter, wherein the internal variable name converter is connected between the accessed variable name storage and the physical address converter.

21. The programmable controller according to claim 20, wherein the central controller is configured to provide a command to register the accessed variable name in the accessed variable name storage and the internal variable name in the internal variable name converter; and the central controller registers the accessed variable name in the accessed variable name storage and the internal variable name in the internal variable name converter by an application program.

* * * * *